United States Patent [19]
Wood et al.

[11] Patent Number: 5,041,922
[45] Date of Patent: Aug. 20, 1991

[54] MAGNETIC RECORDING MEDIUM HAVING MAGNETIC STORAGE AND SATURABLE LAYERS, AND APPARATUS AND METHOD USING THE MEDIUM

[75] Inventors: Roger W. Wood, Gilroy; Beverley R. Gooch, Sunnyvale; Rex Niedermeyer, Redwood City, all of Calif.

[73] Assignee: Ampex Corporation, Redwood City, Calif.

[21] Appl. No.: 555,811

[22] Filed: Jul. 23, 1990

Related U.S. Application Data

[63] Continuation of Ser. No. 100,816, filed as PCT US 86/02732 on Dec. 15, 1986, abandoned, which is a continuation-in-part of Ser. No. 808,921, Dec. 13, 1985, abandoned.

[51] Int. Cl.$^5$ .......................... G11B 5/02; G11B 5/03; G11B 5/74
[52] U.S. Cl. ........................................ 360/55; 360/66; 360/131
[58] Field of Search ...................... 360/55, 66, 15, 131, 360/133–136

[56] References Cited

U.S. PATENT DOCUMENTS

| | | |
|---|---|---|
| 4,277,809 | 7/1981 | Fisher et al. |
| 4,318,136 | 3/1982 | Jeffers. |
| 4,530,016 | 7/1985 | Sawazaki ............................ 360/55 |
| 4,535,369 | 8/1985 | Sawazaki. |

OTHER PUBLICATIONS

Electro-Communication Society, No. 37, 1979.
Electro-Communication Society, No. 38, 1979.
Third Annual Magnetics Conference—Japan, No. 39, 1979.
Third Annual Magnetics Conference—Japan, No. 40, 1979.
Third Annual Magnetics Conference—Japan, No. 41, 1979.
Electro-Communication Society, No. 46, 1979.
Electronic Related Society, No. 48, 1979.

Primary Examiner—A. J. Heinz
Attorney, Agent, or Firm—James A. LaBarre; Thomas E. Ciotti; Ralph L. Mossino

[57] ABSTRACT

Magnetic record media are described that have an overlying or underlying magnetically saturable high permeability keeper layer in addition to a high coercivity magnetic layer in which magnetic signals are stored. These media are used in magnetic signal processing devices whose transducers are capable of generating a keeper layer-saturating bias flux. In signal reproduction the bias flux magnetically forms a saturation zone in the nature of virtual gap in the keeper layer that directs signal flux between the media and the transducer.

34 Claims, 4 Drawing Sheets

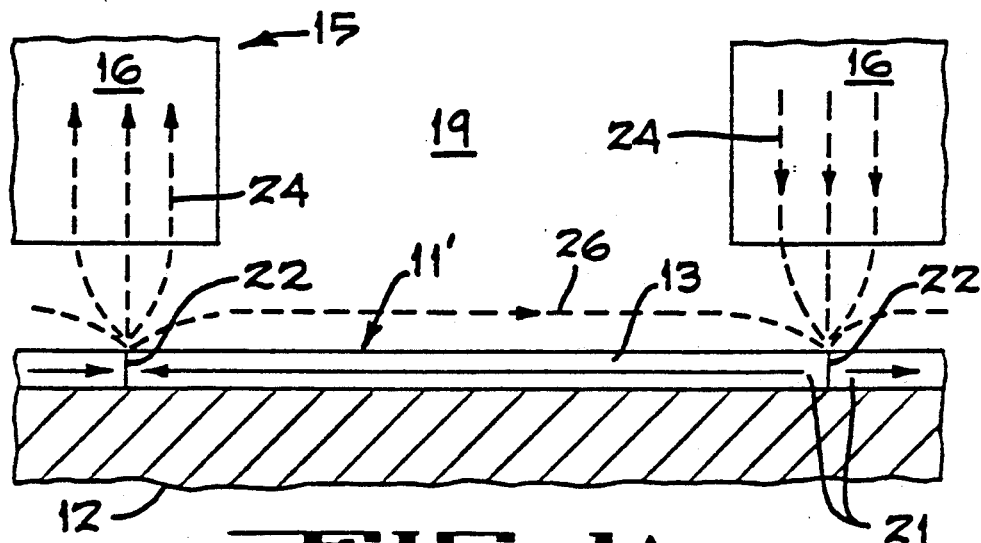
FIG_1A
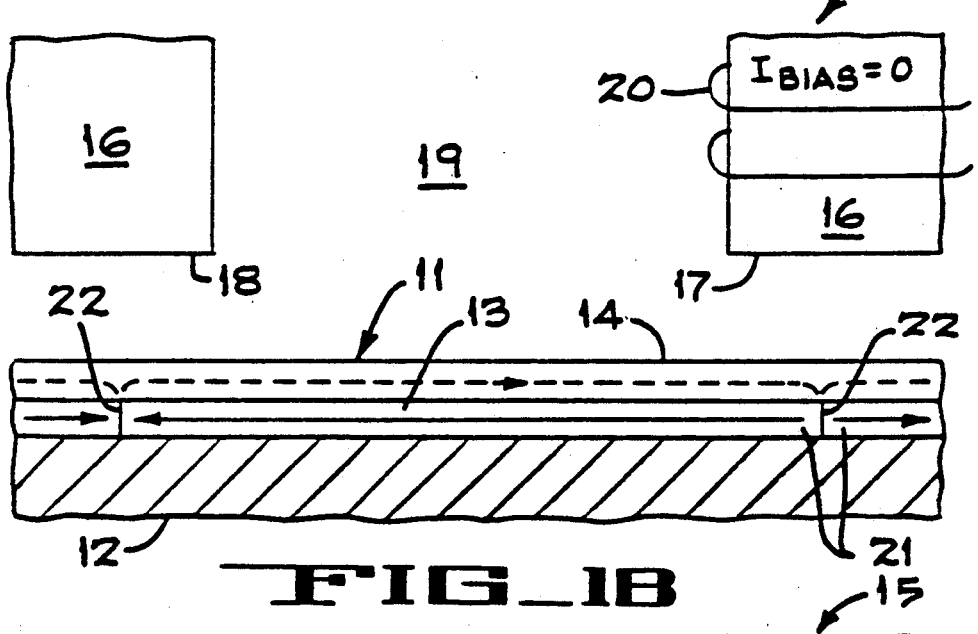
FIG_1B
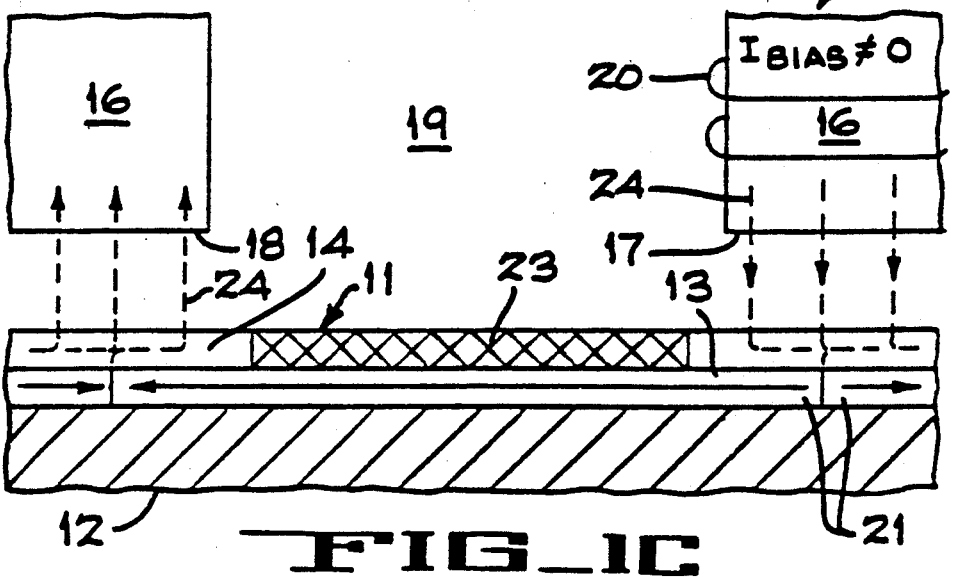
FIG_1C

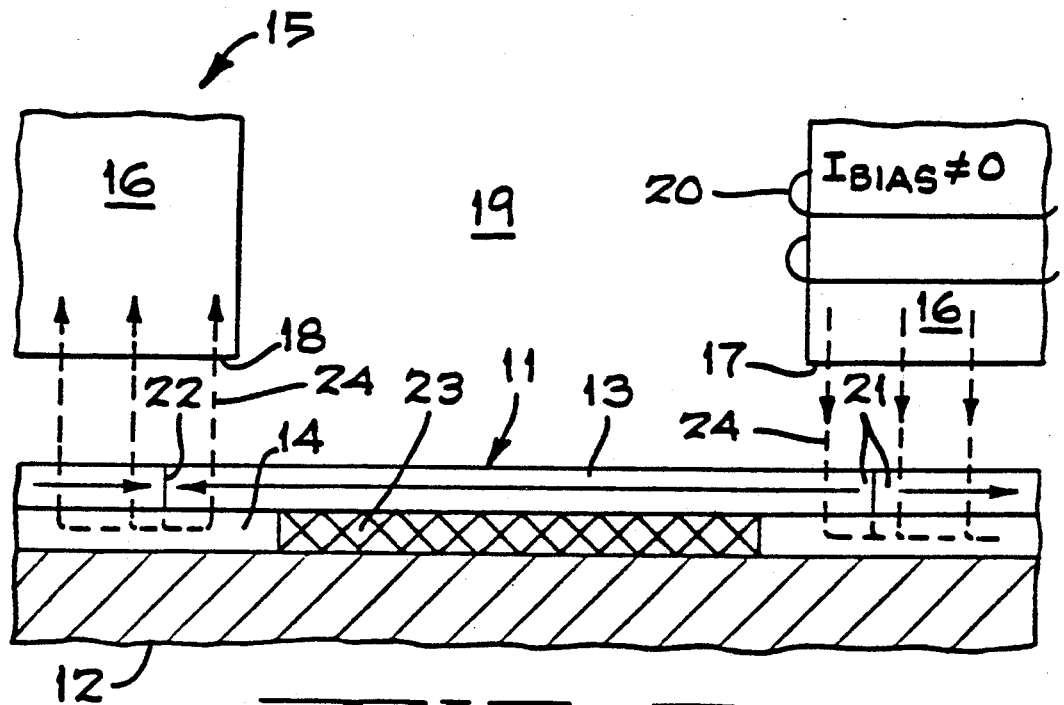
FIG_2
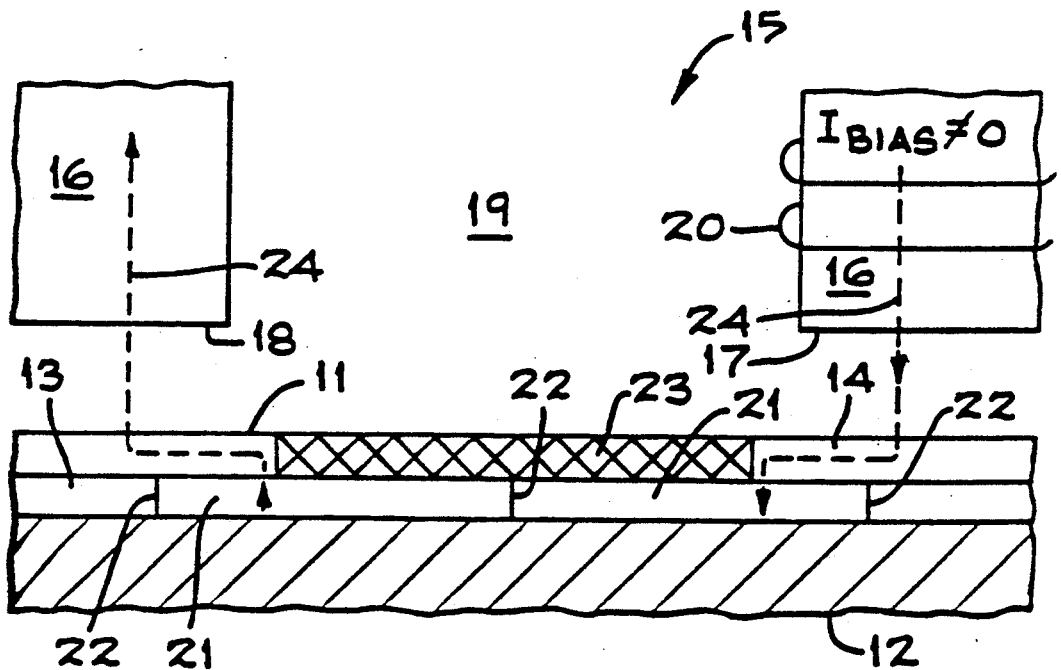
FIG_3

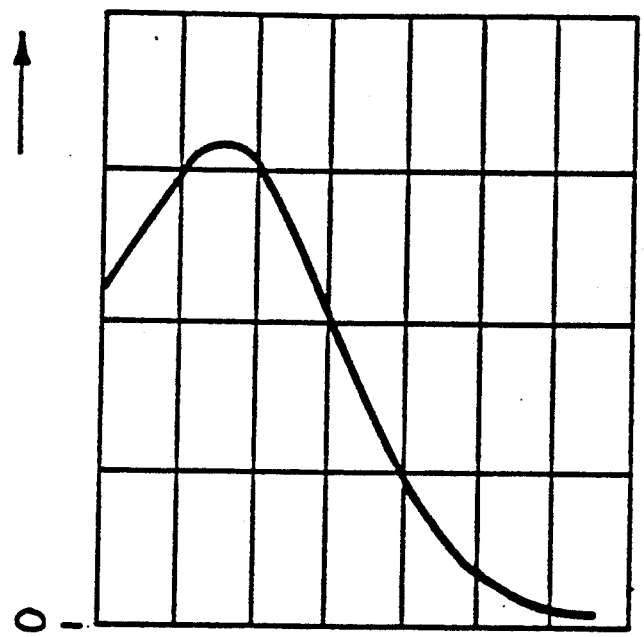
FIG_4
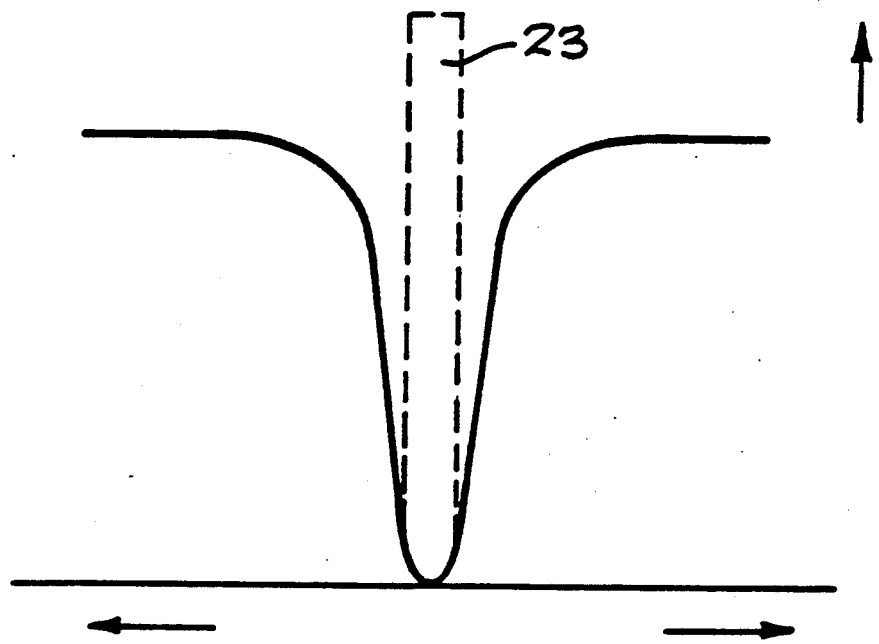
FIG_5

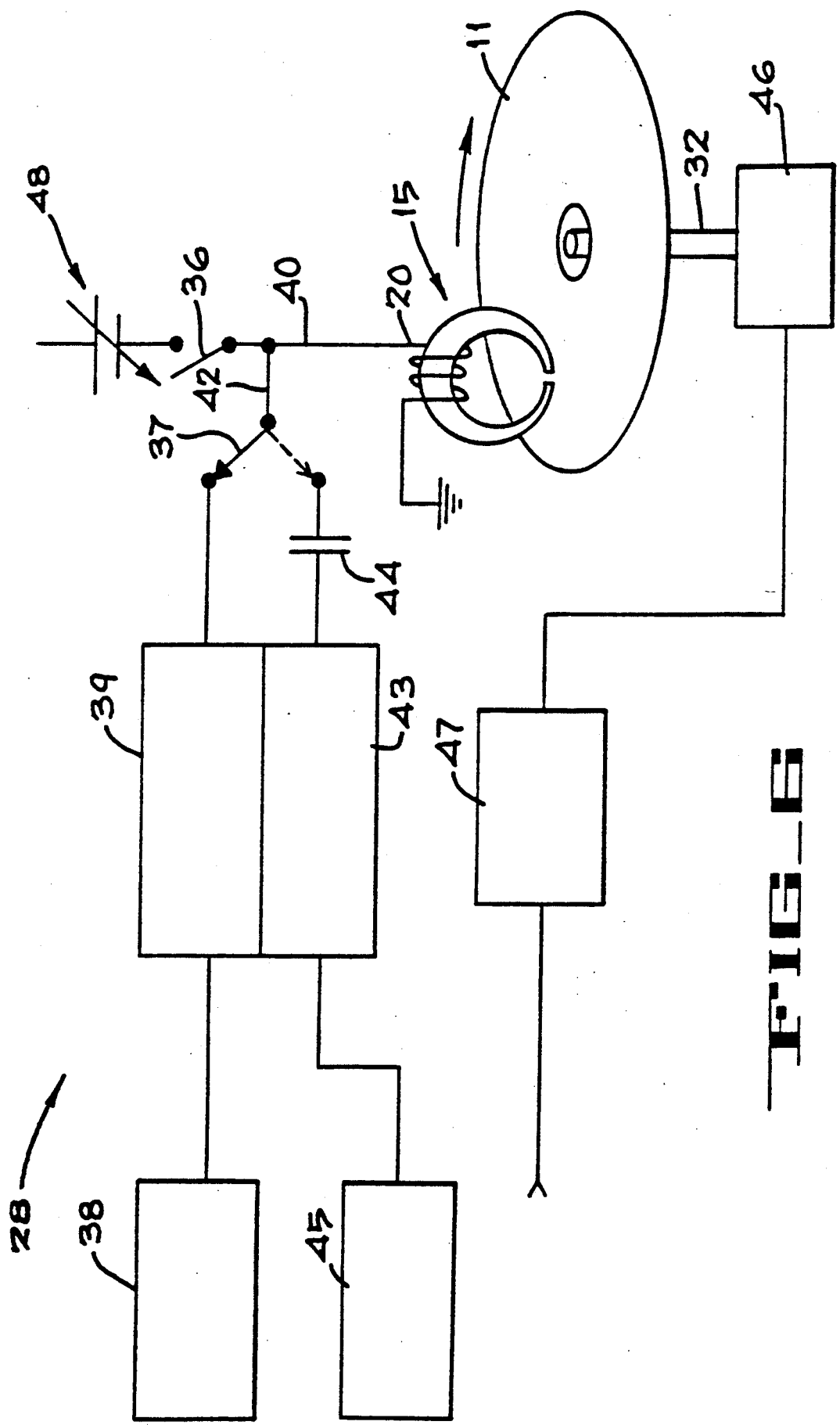
FIG_6

MAGNETIC RECORDING MEDIUM HAVING MAGNETIC STORAGE AND SATURABLE LAYERS, AND APPARATUS AND METHOD USING THE MEDIUM

This is a continuation of our copending U.S. application Ser. No. 07/100,816, filed Aug. 6, 1987, now abandoned, which is based upon and entitled to the benefit of the effective filing data of Patent Cooperation Treaty Patent Application Ser. No. PCT/US86/02732, filed Dec. 15, 1986, which in turn is a continuation-in-part of our U.S. application Ser. No. 06/808,921, filed Dec. 13, 1985, now abandoned.

Cross-reference is made to commonly owned United States National Application Ser. No. 085,676 based upon and entitled to the benefit of the effective filing date of Patent Cooperation Treaty Application Ser. No. PCT/US86/02733 entitled "Method and Apparatus for Magnetic Transducing" and filed concurrently herewith; and United States National Application Ser. No. 128, 115 based upon and entitled to the benefit of the effective filing date of Patent Cooperation Treaty Application Ser. No. PCT/US86/02734 entitled "Method and Apparatus Using A Stationary Saturable Member for Transferring Signals Relative to a Magnetic Storage Medium" and filed concurrently herewith.

All of the above-identified patent applications are assigned to Ampex Corporation, assignee of this patent application.

This invention is in the field of magnetic signal processing involving signal storage and transfers relative to a magnetic storage medium. More particularly, it concerns a magnetic storage medium having, in addition to a high coercivity magnetic storage layer, a magnetically permeable layer in which adjacent regions of different permeabilities are selectably established that permits improved magnetic signal processing.

In conventional wideband, high density magnetic signal processing, magnetic flux to be transferred to or from a magnetic storage medium permeates a magnetic core of a magnetic transducer (head). During reproduction operation modes, this flux produces an induced output voltage in an associated coil winding which, after suitable amplification, is a reproduced representation of the magnetic flux that permeates the core suitable for use by a utilization device. During record operation modes, the permeating flux results from current applied to the coil winding, and fringes from a physical gap provided in the core for recording a representative signal in the magnetic storage medium. Various losses typically occur during such transfers that affect the resulting signal quality adversely. One of the more significant losses is called "spacing loss" and results from the physical spacing between the magnetic storage medium and the transducer. The spacing loss is particularly deleterious to reproduction operations, where the effects of such loss are more significant. Prior efforts to reduce spacing loss primarily involved reducing the physical spacing by placing the transducer as close to the magnetic storage medium surface as operating conditions permitted. This, however, is accompanied by increases in the likelihood of damaging collisions between the transducer and medium in devices in which the transducer is supported above the medium surface out of contact therewith, i.e., in which the transducer "flies" relative to the medium, or excessive medium and/or transducer wear in devices in which the transducer is in contact with the medium during signal transfer operations.

In addition to spacing loss, signal quality is affected adversely by poor efficiency in signal transfer by the transducer. Reproduce gap loss is an example of one of the sources of poor efficiency. This is caused by the finite length of the physical gap within the transducer that is responsible for effecting signal transfers between the transducer and medium, and is manifested by a loss of output signal at shorter wavelengths. Reproduce gap loss is considered to be an inherent result of transducer geometry.

The present invention provides for the reduction in spacing loss without need of moving the transducer physically closer to the medium. The quality of signals transferred relative to the magnetic storage medium can thus be improved without increasing the likelihood of damage or wear to the transducer and/or medium. In addition, the method and apparatus of the present invention permits improvement in the efficiency of signal transfers, such as by reduction of reproduce gap loss that enables transducers to achieve improved signal reproduction at short wavelengths.

The cross-referenced, commonly owned patent applications referred to above concern arrangements of magnetic transducers and associated bodies of magnetic material that cooperate to form a transducing zone free of a physical gap for effecting signal transfers relative to a magnetic storage medium. More specifically, in the embodiments illustrated in the figures and described in these applications, the associated body of magnetic material is located to be magnetically proximate the magnetic storage medium and the transducer, with the transducing zone located for the coupling of flux between the body, transducer and the magnetic storage medium. (As used herein, the phrase "magnetically proximate" means that the body of magnetic material is positioned relative to the proximate object or field so that flux coupling between the two occurs, assuming that saturation or some similar magnetic affect does not prevent coupling.) The preferred material of the associated body has a high absolute permeability and, as compared to magnetic storage media, low coercivity and low magnetic saturation density. Such a material is commonly designated a soft magnetic material and is to be contrasted with "hard" magnetic materials, i.e., materials having a high coercivity and magnetic saturation density, such as those that magnetically store information. Keepers are bodies of magnetic material having such characteristics. Keepers are commonly placed over the ends of permanent magnets to capture and provide paths for flux between the magnetic poles of the magnets to protect them against being demagnetized. The magnetic material typically used to make cores of magnetic transducers has characteristics similar to those of a keeper.

The transducing zone is formed in the associated body or keeper by creating in the same one or more significant magnetic discontinuities, i.e., areas of substantially different magnetic permeability, such as typically are provided in magnetic transducers by the inclusion of a physical transducing gap. A permeability gradient provides such discontinuity, and in the embodiments of the cross referenced applications, it is preferred a steep permeability gradient be established between adjacent magnetically saturated and magnetically unsaturated regions that define the transducing zone. A steep permeability gradient also is desired in the preferred embodiments of the present invention. The nature of such gradient and a preferred manner of achieving the same will be described in more detail hereinafter. In the apparatus of the present invention, such discontinuity is most simply provided in the region defining the transducing zone by having adjacent magnetically saturated and unsaturated regions. Moreover, a transducing zone can be easily generated and defined in the region through the cooperation of a physical gap in a conventional magnetic transducer and a source of magnetic bias flux. While in the embodiments of the cross referenced applications, this source of bias flux can be associated solely with the transducer or solely associated with the keeper body and, in some instances, associated with both of the same, in accordance with the present invention, the bias flux source is associated with the transducer. Moreover, during record operations, the source of bias flux simply can be provided by record signal flux passing through the region defining the transducing zone.

As described in the cross referenced applications, the thickness of the keeper is important in determining the performance of the keeper. The selection of the thickness of the keeper depends on its purpose and its location. For reproduce operations, for example, a well-defined transducing zone is preferred, and for short wavelength signals, one having a short length. Relatively thin keepers are best for such operations. In applications where head and medium wear avoidance is important, such as in contact record and/or reproduce devices, a thicker keeper is preferred. Moreover, the transducer-keeper-magnetic storage medium arrangement also can influence the keeper thickness. In any case, the thickness of the keeper is selected relative to potential flux therein to create the transducing zone at the location desired. For example, in arrangements in which the keeper engages the face of a magnetic core defining a physical gap so as to physically bridge such gap and a predominant amount of the bias flux flows in the head as well as in the keeper, the keeper is selected to be thin with respect to the core adjacent the gap, and the keeper-core cross-sectional area perpendicular to the bias flux path adjacent the gap is selected to be large, so the portion of the keeper which bridges the physical gap will have a high flux density, preferably one which saturates the region having the same. The permeability of the saturated regions is low, i.e., similar to nonmagnetic materials, while the permeability of the surrounding regions remains high. These regions cooperate to define a transducing zone within the body.

In the preferred embodiments described in the cross referenced application Ser. No. 128,115, a transducer having a keeper in close proximity of the transducer core and bridging the physical gap of the transducer is described in which the core is mechanically movable and the keeper is stationary. Means are associated with the transducer core and are coupled to provide a flux directed by the physical gap in the core to saturate the keeper in an area which bridges the physical gap. This saturated area represents a magnetically formed transducing gap. In the preferred embodiments described in cross referenced application Ser. No. 128,115, the keeper is interposed the transducer core and medium. This placement of the keeper eliminates wear of the physical transducer gap and, if the medium is in contact with the keeper during signal transfers, reduces spacing losses as well. In the preferred embodiments described in the cross referenced application Ser. No. 085,676, the keeper and transducer core are in direct contact and stationary with respect to each other. This arrangement, too, eliminates direct physical contact between the physical gap in the transducer core and the medium, and in arrangements where the keeper is also in direct contact with the magnetic storage medium, reduces spacing losses. Accordingly, while such transducer-keeper combination embodiments described in the cross-referenced applications are characterized by reduced wear and spacing loss characteristics, considerable advantage will be realized by the provision of a magnetic record medium and method of magnetically transferring signals with respect to same having comparable characteristics. Such media and method enables existing magnetic record and/or reproduce devices to take advantage of the reduced wear and spacing loss characteristics without the necessity of substantial modification of their structure.

In accordance with the present invention, a magnetic recording medium is provided that has, in addition to a high coercivity magnetic layer for storing magnetic signals, a magnetically permeable layer in which adjacent regions of different permeabilities are selectably established. In preferred embodiments of the present invention, the differentially permeable layer and high coercivity magnetic storage layer are separate discrete contiguous layers supported upon a substrate. A source of magnetic flux is arranged to direct a bias flux to the differentially permeable layer and locally establish therein adjacent regions of different permeabilities in a zone opposite to and bridging the physical gap of a magnetic transducer to form a virtual gap in the zone that functions as a gap-less transducing zone. Upon application of the bias flux, the resulting establishment of adjacent regions of different permeabilities enables signal flux transfers between the magnetic transducer and the magnetic storage layer through the highly permeable areas adjacent the zone. As will become more apparent from the following description of embodiments of the present invention, the formation of the transducing zone in the differentially permeable layer contiguous with the magnetic storage layer functionally eliminates the physical spacing between the magnetic transducer and magnetic storage layer, and allows magnetic coupling between the magnetic core of the transducer and storage layer for the transfer of signals. It has also been unexpectedly found that signal transfers are improved at shorter wavelengths through use of the media of the present invention. Empirical plots (signal strength vs wavelength) for playback signal transfers of data indicate the presence of the differentially permeable layer in the media of the present invention causes a favorable shift towards shorter wavelength at which the first order, wavelength dependent null in response occurs (commonly referred to as "gap null"). This indicates the length of the magnetically formed virtual gap or transducing zone in the differentially permeable layer can be controlled to be smaller than the physical gap of the magnetic transducer.

In preferred embodiments of the present invention, the differentially permeable layer in which the gap-less transducing zone is formed is a continuous, magnetically saturable layer of high permeability, low coercivity magnetic material that is an integral part of a laminated composite magnetic recording medium. The adjacent regions of different permeabilities are conveniently provided in preferred embodiments of the present invention by establishing adjacent magnetically saturated and unsaturated regions. In addition, the layer also advantageously serves to retain flux from signals recorded in the magnetic storage medium in absence of a bias flux that magnetically effects the formation of the transducing zone in the saturable layer.

High permeability, nonsaturable underlayers have been used previously in perpendicular magnetic storage media to direct record flux along a well defined path and to provide a flux path for reproduction. In contrast to the differentially permeable or saturable layer of the medium of the present invention, the underlayers in these prior media are designed to be unsaturable by making them thick relative to the expected flux density during record signal transfers to the media. These underlayers do not function as the differentially permeable or saturable layer in the medium of the present invention, do not form a defined transducing zone for effecting signal transfers between transducers and media, and have no effect on spacing and reproduce gap losses, nor wear of magnetic transducers and storage media.

Further, in accordance with the present invention, a magnetic signal processing apparatus is provided that uses such magnetic storage medium. This apparatus includes magnetic flux generating means, such as a permanent magnet associated with the transducer, an external bias coil in proximity to the transducer, or a source of auxiliary current coupled to the signal winding associated with the magnetic core of the transducer, for generating the bias field that forms the zone of adjacent regions of different permeabilities in the differentially permeable layer proximate the physical gap of the transducer. Existing magnetic record and/or reproduce devices may be readily modified to include such means. There is thus no need to radically redesign conventional transducers or record and/or reproduce circuitry in order to implement the advantages of the method and apparatus of the present invention in existing magnetic record and/or reproduce devices. Moreover, in the apparatus of the present invention, the transducer and magnetic record medium surface may be spaced to lessen the likelihood of transducer and/or medium damage or wear, as there is no need to space them as close as possible to lessen spacing loss.

In the following detailed description, the method and apparatus of the present invention will be described with reference to specific embodiments thereof. However, it will be appreciated that the magnetic record medium of the present invention may be utilized in combination with signal utilization devices in general, and therefore the invention is not limited to the described embodiments.

FIG. 1A is a schematic partial view of a conventional (prior art) magnetic medium and transducer in a reproduce operation mode;

FIG. 1B is a schematic partial view of one embodiment of the magnetic record medium of the present invention in operative association with a magnetic transducer under a non-biased reproduce operation condition;

FIG. 1C is a view of the same arrangement as shown in FIG. 1B under a biased reproduce operation condition;

FIG. 2 is a schematic, partial view of a second embodiment of the magnetic record medium of the present invention in operative association with a magnetic transducer under a biased reproduce operation condition;

FIG. 3 is a schematic, partial view of a third embodiment of the magnetic record medium of the present invention in operative association with a magnetic transducer under a biased reproduce operation condition;

FIG. 4 is an example of a flux density versus permeability characteristic of a well known magnetic material;

FIG. 5 shows flux density versus permeability characteristic across the length of a transducing zone established in the differentially permeable layer of an embodiment of the magnetic record medium of the present invention; and FIG. 6 is a block diagram of a system for recording and reproducing signals in relation to a magnetic record medium in accordance with the present invention.

In the drawings and following description like elements are designated by like reference numerals to facilitate comparison between the depicted embodiments. The description of similar elements illustrated in more than one figure of the drawings may not be repeated with reference to each of the figures.

Magnetic record media embodiments in accordance with the present invention will be described now which are laminated composite structures having a high coercivity (hard) magnetic layer for receiving and storing magnetic signals, and a saturable, high magnetic permeability, low coercivity (soft) layer that effects the transfer of magnetic signal flux between a magnetic transducer and the high coercivity magnetic layer. Referring to FIGS. 1B and 1C there is shown a magnetic record medium 11 comprising a substrate layer 12 made of a nonmagnetic material, such as aluminum or plastic, a hard magnetic layer 13 made of a high coercivity magnetic material, and an overlying magnetically saturable layer 14 made of a high magnetic permeability, low coercivity material, such as a Ni-Fe alloy (e.g., permalloy) or an Fe-Al alloy (e.g., Alfesil). The high coercivity magnetic layer 13 may be in the form of magnetic particles dispersed in a binder or a continuous film of high coercivity magnetic metal or metal alloy. In opposed spaced relationship to the medium 11, is a magnetic transducer 15 having a magnetic core 16 with confronting poles 17, 18 defining a physical gap 19 therebetween. The core 16 is fabricated from a magnetic material suitable for conventional magnetic transducers, such as ferrite, and preferably, a nonmagnetic material, for example glass or silicon dioxide, is provided between the poles 17, 18 of the core to obtain a well defined physical transducing gap 19. The magnetic core 16 defines a magnetic flux path for transferring information signals between the magnetic storage medium 13 and a means, such as a coil winding 20 disposed about the core, is placed in magnetic coupling relation to the flux path for coupling the flux path with an information signal source 38 (FIG. 6) during record operation modes and with an information signal utilization device 45 (FIG. 6) during reproduce operation modes. The transducer core 16, poles 17, 18, transducing gap 19 and coil winding 20 may be made in a known manner and a detailed description thereof, is therefore, not provided.

The magnetic record medium 11 according to this invention may be made using fabrication techniques that are well known in the magnetic record media art, and a detailed description thereof is therefore not provided. By way of example, in media in which the hard magnetic layer 13 is made of a dispersion of magnetic particles in a binder, the layer may be deposited on a suitable substrate 12 using casting procedures commonly used to make conventional magnetic tape. In embodiments wherein the hard magnetic layer 13 is a continuous metal or metal alloy film, the layer may be deposited by plating (electro or electroless) or sputtering. The magnetically saturable layer 14 may also be deposited by plating or sputtering. Depending on the type of medium and intended application for it, other layers, such as durable overcoats, or conducting coats, may be included in the laminated composite.

For comparison purposes, a conventional magnetic recording medium 11' comprising only a substrate layer 12 and a hard magnetic layer 13 is shown in FIG. 1A.

Digital or analog signals may be recorded on magnetic medium 11 in a conventional manner as is known in the art. FIGS. 1A–C illustrate the recording of digital signals in the magnetic storage layer 13 in longitudinal fashion. In this regard, the recorded magnetic layer 13 is depicted as having a multiplicity of individual regions 21 in which the magnetic signals or bits (depicted by solid arrows) are stored. The axes of magnetization of the regions 21 are oriented horizontally relative to the plane of the magnetic layer 13.

In conventional record medium 11' (FIG. 1A) during, for example, playback operation modes, a portion of the signal flux (indicated by dashed lines 24) from a given magnetic transition 22 links to the flux path established by the magnetic core 16 of the transducer 11, while the remainder of the flux is shunted along the flux leakage path 26 to adjacent magnetic transitions 22. The flux that links to the flux path within the transducer 11 induces an output voltage in the coil winding (not shown in FIG. 1A) associated with the transducer. In the case of the magnetic record medium 11 of the present invention, in the absence of a bias flux (FIG. 1B, $I_{bias}$ equal to 0), essentially the entire flux from a given magnetic transition 22 will tend to be confined by the magnetic saturable layer 14 because of the layer's low reluctance, high permeability path, and shunted to adjacent magnetic transitions. Accordingly, little, if any, flux reaches the transducer 11 when no bias is applied and, correlatively, no playback or other signal transfer can occur.

FIG. 1C shows what occurs when an appropriate bias field ($I_{bias}$ not equal to 0) is coupled to the flux path established by the core 16, for example, by passing a bias current through transducer winding 20. In this instance, the bias flux emanating from the physical gap 19 of the transducer 11 permeates the high permeability, saturable layer 14 and creates a zone of saturation 23 in that layer proximate of the physical gap. Such saturation lowers the permeability in the zone 23. The zone thus defines a magnetically formed virtual gap in the layer. Because the zone 23 is saturated by the bias flux, the signal flux from magnetic storage layer 13 is not shunted through the zone. Instead, the signal flux from the storage layer 13 is directed to the magnetic core 16 of the transducer 11 through unsaturated regions of the saturable layer 13 adjacent the zone 23. In effect, then, the portion of the layer 13 located opposite the physical gap 19 of the transducer 11 functions to couple the signal between the transducer 11 and magnetic storage layer 13, and thereby functionally eliminating the physical spacing between the transducer and storage layer that contributes to spacing loss. The magnitude of the bias flux required to saturate zone 23 will depend upon the particular magnetic characteristics of the material forming the saturable layer 14 and the cross-sectional area of that layer in a direction perpendicular to the surface of the magnetic record medium 11, hence the layer's thickness. The material characteristics and area of saturable layer 14 are selected relative to the magnetic characteristics and thickness of the high coercivity magnetic layer 13 such that the bias flux required to saturate the layer 14 and form zone 23 is less than the flux required to erase or otherwise undesirably alter or affect signals recorded in the high coercivity magnetic layer 13. Further, the saturation value (flux density at saturation) of the saturable layer 14 should be such that this layer is not saturated by the signal flux alone emanating from the magnetic record medium 11. The saturation value of the layer 14 is also a function of the magnetic characteristics of the material from which it is made and its thickness. It is also preferable that the saturable layer have a sharp saturation transition in the B-H (flux density vs field strength) profile at the boundaries between the saturated zone 23 and adjacent unsaturated regions to enhance efficiency (reduce or minimize the portion of the signal flux that bridges the saturation zone 23 and thus does not contribute to signal transfers between the transducer 15 and magnetic storage layer 13).

As described hereinbefore, the saturable layer 14 can be formed of materials, such as permalloy or Alfesil, commonly used to fabricate keepers for permanent magnets. The keeper layer is fabricated to provide a reluctance to flux along a path within the keeper relative to the reluctance along a path that extends through the magnetic core 16 of the transducer 15 (see 24 in FIG. 1C) to assure that the desired transmission of information signals occur between the magnetic storage layer 13 and the magnetic core 16 of the transducer. The relative reluctances are achieved through the selection of appropriate combinations of various characteristics, such as materials, thickness of materials, size of area of transducer poles that face the magnetic record medium 11, size of area of saturated zone 23 of the keeper 14 in a plane perpendicular to the surface of the medium 11, thickness of the keeper layer 14, distance (if any) separating the transducer 15 and the keeper 14, and the length, width and depth, of physical gap 19. Preferably, the keeper 14 has a very small thickness t in the direction of the depth of the physical gap 19 so as to have a small cross-sectional area at such gap for saturation by bias flux as will be described.

FIG. 4 shows a permeability m versus flux density B characteristic of a suitable magnetic material for fabrication of the keeper layer 14. As seen from that characteristic, the material has a large difference in permeability over a narrow range of flux densities. FIG. 5 illustrates the effect of saturating the keeper layer 14 at the localized zone 23. From FIGS. 4 and 5, it is seen that it is desirable that the overall permeability versus flux density gradient be as sharp as possible in order to obtain well defined boundaries between the saturated zone 23 and the adjacent unsaturated regions of the transducing zone through which signal flux is coupled between the transducer 15 and magnetic storage layer 13.

In embodiments constructed in accordance with the present invention, keeper layers 14 of permalloy having a thickness in the range of about 300 to 1000 Angstroms were deposited on a cobalt-phosphorus electroless plated magnetic storage layers 13 having a thickness in the range of about 700 to 1500 Angstroms. The thusly deposited keeper layer 14 had a magnetic coercivity of less than one, whereas the magnetic storage layer 13 had a coercivity of about 1000. The magnetic permeability of the keeper layers were in the range of 1000 to 2000 in the unsaturated regions. In the saturated region 23 of the transducing zone, the permeability was in the range from that approaching 1 to about 100. For optimum efficiency, the permeability difference between the adjacent saturated and unsaturated regions of the transducing zone should be as large as practicable. However, a 10:1 ratio of permeability between the saturated and unsaturated regions will enable transfers of signal information between the transducer 15 and magnetic storage layer 13.

The thickness of the keeper 14 influences the length of the saturated zone 23, i.e., the dimensions in the direction of separation of the poles 17 and 18 of the transducer 15. Moreover, keepers of greater thickness require more bias flux to establish the desired saturated zone. For recording operations, a well defined saturated zone of small length dimension is not as critical as for playback operations, because recording in the magnetic storage medium is primarily determined by the magnetic state occurrences at the trailing edge of the saturated zone 23, i.e., the edge of the saturated zone 23 last able to influence the recording on the medium 11 during relative motion between the transducer 15 and the medium 11. For playback operations, however, a well defined saturated zone 23 with a small length dimension is preferred. In any event, to achieve the advantages of reduced spacing loss, the thickness of the keeper layer 14 and the strength of the magnetic field bias for establishing the saturated zone 23 should be selected so that the length dimension of the saturated zone is not so large as to permit objectionable fringing flux wavelength dependent coupling from the physical gap 19 of the transducer 11 to the magnetic storage layer 13. Such objectionable coupling will occur at least when the length dimension of the saturated zone 23 becomes so large that it appears to the transducer 11 and magnetic storage layer 13 equivalent to an air space that exists in arrangements without a keeper layer 14, such as depicted by FIG. 1A. The thickness and bias flux needed to achieve the desired reduction in playback loss can be determined empirically.

FIG. 2 shows a second embodiment of a magnetic record medium 11 of the present invention. In this embodiment, the keeper layer 14 underlies (relative to the transducer 15) the hard magnetic layer 13. As in FIG. 1B, when no bias flux is applied, flux from recorded signals in the hard magnetic storage layer 13 is captured by the underlying keeper layer 14 and shunted therethrough rather than being linked to the magnetic core 16 of the transducer 15. When bias flux is applied, however, the flux produces a magnetically formed high reluctance saturation zone 23 in the underlying keeper layer. As a result of the establishment of the high reluctance saturation zone 23, signal flux transferred with respect to the magnetic storage layer 13 is directed along the path represented by dotted lines 24 between layer 13 and the high permeability magnetic core 16, rather than being shunted through the keeper layer 14 to adjacent magnetic transitions.

FIG. 3 shows another embodiment of the magnetic record medium 11 of the present invention that is similar to the embodiment of FIGS. 1B and 1C, except that the signals are recorded on the magnetic storage layer 13 in vertical (perpendicular) fashion. In this embodiment, the axes of magnetization of regions 21 are substantially perpendicular relative to the plane of the hard magnetic storage layer 13. As in the embodiments of FIGS. 1B and 1C, the signal flux recorded in the hard magnetic storage layer 13 is attracted by unsaturated regions of the overlying keeper layer 14 adjacent a magnetically formed high reluctance saturation zone 23, which is established by a bias flux from the transducer 15. Again, since the attracted signal flux is prevented from being shunted through the high reluctance saturation zone 23, it flows between the magnetic core 16 of the transducer 15 and the magnetic storage layer 13 along a path depicted by dotted line 24.

FIG. 6 shows a block diagram of a signal processing system 28 that uses a magnetic recording medium 11 corresponding to that described with reference to FIGS. 1B, 1C, 2 and 3. In FIG. 6, the medium 11 is shown in the form of a rigid disc. It will be appreciated that the method and apparatus of the present invention may be adapted to other forms of magnetic recording media, such as tape and flexible discs. Disc 11 is mounted on a motor spindle 32 for rotation beneath a magnetic transducer 15 that has a winding 20 for carrying current during record and playback operations. The single winding 20 is employed to carry the input signal and bias currents during record operation modes, and the bias and reproduce signal currents during playback operation modes. As described hereinbefore, if record current of sufficient strength is provided during record operation modes, a separate bias current need not be provided.

In a record operation mode, a switch 36 is open and a switch 37 is in its first position (indicated by solid lines). Signal current from a source 38 is amplified by a record amplifier 39, and transmitted through switch 37 and line 40 to winding 20. This signal current generates a signal flux in transducer 15 that leaves the physical gap of the transducer 15, permeates disc 11, and is recorded in the hard magnetic layer of the disc. The magnitude of the signal current is adjusted so that the flux that leaves the physical gap is sufficient to form the zone of saturation in the keeper that effects the desired signal transfer from the transducer 15 to the disc 11, as described hereinbefore with reference to FIGS. 1–3.

In a reproduce operation mode, switch 36 is closed and switch 37 is in its second position. The closing of switch 36 couples an adjustable D.C. current source 48 to line 40. Source 48 provides the bias current, $I_{bias}$, that is transmitted through line 40 to winding 20. The bias current generates a bias flux that leaves the physical gap of the transducer to permeate the keeper layer of disc 11, thus creating the zone of saturation in the keeper that effects the coupling of recorded flux from the disc 11 to the magnetic core of the transducer 15. The reproduce signal flux intercepts the winding 20 and generates an induced voltage signal therein. This signal is transmitted by line 42 and switch 37 to a reproduce amplifier 43. The amplified playback signal is transmitted from the amplifier 43 to the utilization device 45. A capacitor 44 is connected in line 43 to block any DC component of the reproduce signal that may have been generated by the bias. If a bias source is needed for record operation modes, a similar capacitor is provided between the record amplifier 39 and switch 37 for the same purpose. While the embodiment of FIG. 6 utilizes a D.C. bias to establish the saturated zone in the keeper layer of the disc record medium 11, the bias can be established various ways. For example, a permanent magnet in proximity to the keeper layer of the magnetic record medium can be employed to interact with the magnetic core of the transducer 15 and effect the localized saturation of the keeper layer needed to form a transducing zone. An A.C. current source may be employed as well. When using an A.C. bias, it is preferred an A.C. current source be used providing transitions between bias signal states that are very fast relative to those of the information signals to be transferred relative to the magnetic record medium. If AC bias is used, it may be necessary to replace capacitor 44 with an AC filter to prevent unwanted bias-generated signals from being coupled into the reproduce circuitry.

Synchronization of the motor 46 that drives the motor spindle 32 on which the disc is mounted is accomplished by a servo 47 that uses a tachometer signal provided by a tachometer mechanism operatively linked to the spindle 32, or a signal recorded on the disc record medium 11 along a dedicated servo track. In the embodiment of FIG. 6, servo 47 receives the tachometer, servo or equivalent signal and compares it with a system reference signal, and adjusts the motor drive, if necessary, to synchronize the rotation of the disc 11 to the system reference signal.

While the invention has been shown and described with particular reference to various embodiments thereof, it will be understood that variations and modifications in form and detail may be made therein without departing from the spirit and scope of the invention as defined in the appended claims.

What is claimed is:

1. A magnetic recording medium comprising;
   (a) a nonmagnetic substrate;
   (b) a magnetically coercive material disposed on said substrate for storing magnetic signals; and
   (c) a magnetically permeable, magnetically saturable material disposed on the substrate so as to effect the storage of said magnetic signals in said magnetically coercive material with preferred axes of magnetization that are oriented substantially parallel to the surface of the substrate.

2. The magnetic recording medium of claim 1 wherein said magnetically coercive material is disposed on said substrate in a first layer and said magnetically permeable material is disposed on said substrate in a second discrete layer.

3. The magnetic recording medium of claim 2 wherein the layer of magnetically permeable, magnetically saturable material overlies the magnetically coercive layer relative to said substrate.

4. The magnetic recording medium of claim 2 wherein the layer of magnetically permeable, magnetically saturable material underlies the magnetically coercive layer relative to said substrate.

5. The magnetic recording medium of claim 2 wherein the materials and relative thicknesses of the layer of magnetically permeable, magnetically saturable material and the magnetically coercive layer are such that a flux required to saturate the layer of magnetically permeable, magnetically saturable material is less than a flux required to affect magnetic signals stored in the magnetically coercive layer.

6. The magnetic recording medium of claim 2 wherein the layer of magnetically permeable, magnetically saturable material is a keeper.

7. In a magnetic signal processing apparatus having a magnetic record medium in which signals are received and stored in a magnetically coercive layer and a magnetic transducer in closely spaced relationship to the surface of the medium, the improvement wherein the magnetic record medium includes a magnetically permeable, magnetically saturable material and the transducer has means associated therewith for generating a saturating magnetic bias flux directed by the transducer into said saturable material.

8. The apparatus of claim 7 wherein said saturable material is disposed on said magnetic record medium in a discrete layer.

9. The apparatus of claim 8 wherein the materials and relative thicknesses of the saturable layer and the magnetically coercive layer are such that the flux required to saturate the saturable layer is less than the flux required to affect magnetic signals stored in the magnetically coercive layer.

10. The apparatus of claim 7 wherein the magnetic signals are stored in the magnetically coercive layer with their axes of magnetization substantially parallel to the plane of the magnetically coercive layer.

11. The apparatus of claim 10 wherein the saturable material is disposed in a discrete layer which overlies the magnetically coercive layer on the side of said coercive layer which is closest to said transducer.

12. The apparatus of claim 10 wherein the saturable material is disposed in a discrete layer located on the side of the magnetically coercive layer that is remote from said transducer.

13. The apparatus of claim 7 wherein the signals are stored with their axes of magnetization substantially perpendicular to the plane of the magnetically coercive layer and the saturable material is disposed in a discrete layer which overlies the magnetically coercive layer on the side of said coercive layer which is closest to said transducer.

14. The apparatus of claim 7 wherein the bias flux is generated by a direct-current source.

15. The apparatus of claim 7 wherein the bias flux is generated by an alternating current source.

16. A magnetic signal processing apparatus comprising:
   (a) a magnetic record medium having a magnetically coercive material for receiving and storing signals and a magnetically permeable, magnetically saturable material;
   (b) a magnetic transducer positioned relative to the surface of the medium for transferring signals with respect to the medium;
   (c) means for relatively moving the medium and the transducer; and
   (d) means for generating a bias field in the transducer which saturates a portion of said saturable material during signal transfers between the medium and transducer.

17. The apparatus of claim 16 wherein the signals are stored in the magnetically coercive material with their axes of magnetization substantially parallel to the plane of the record medium.

18. The apparatus of claim 16 wherein said coercive material and said saturable material are disposed in respective layers on a substrate.

19. The apparatus of claim 18 wherein the saturable layer overlies the magnetically coercive layer relative to said substrate.

20. The apparatus of claim 18 wherein the saturable layer relative to said substrate underlies the magnetically coercive magnetic layer.

21. The apparatus of claim 18 wherein the signals are stored with their axes of magnetization substantially perpendicular to the plane of the magnetically coercive layer, and the saturable layer overlies the magnetically coercive layer relative to said substrate.

22. The apparatus of claim 18 wherein the materials and relative thicknesses of the saturable layer and the magnetically coercive layer are such that the flux required to saturate the saturable layer is less than the flux required to erase magnetic signals from the magnetically coercive layer.

23. The apparatus of claim 16 wherein the means for generating a bias field in the transducer is a current threading a winding on the transducer.

24. In a method of processing magnetic signals using a magnetic transducer having a physical transducing gap and a closely spaced magnetic storage medium having a magnetically coercive layer with respect to which the signals are transferred, the improvement comprising:
(a) providing the magnetic storage medium with a magnetically permeable, magnetically saturable material; and
(b) generating a magnetic bias flux in the transducer during signal transfers with respect to the magnetic storage medium that saturates a portion of the magnetically permeable, magnetically saturable material proximate of the transducing gap.

25. The method of claim 24 wherein the bias flux is below a level sufficient to affect the signals stored by the magnetic storage medium.

26. The method of claim 24 wherein the bias flux is generated by application of a direct current to the transducer.

27. The method of claim 24 wherein the bias field is generated by application of an alternating current to the transducer.

28. A magnetic recording medium comprising:
a nonmagnetic substrate;
a first layer of magnetic material having a relatively low magnetic permeability and a relatively high magnetic coercivity for storing information therein as magnetic states; and
a second layer of magnetic material having a relatively high magnetic permeability and a relatively low magnetic coercivity and whose thickness relative to that of said first layer is such that the density of magnetic flux required to saturate said second layer is less than the density of magnetic flux required to alter magnetic states in said first layer.

29. A magnetic recording medium for use in a recording/reproducing system of the type in which a bias flux is applied to the recording medium to define a signal transfer zone, comprising:
a nonmagnetic substrate;
a magnetically coercive layer whose magnetization is controlled to store magnetic signals; and
a layer of magnetically permeable material having a thickness such that a portion of said layer becomes saturated by an applied bias flux whose magnitude is less than that required to alter the magnetization of said coercive layer to thereby establish a signal transfer zone.

30. A magnetic recording medium for use in a recording/reproducing system in which magnetic information is transferred between a transducer and the record medium, comprising:
a nonmagnetic substrate;
a layer of magnetically coercive material in which the magnetic information is stored; and
a magnetically permeable material disposed on the substrate in a manner such that material becomes selectively saturated during the transfer of information between a transducer and the layer of magnetically coercive material.

31. The magnetic recording medium of claim 30 wherein said magnetically permeable material is disposed in a discrete layer that is contiguous with said coercive layer.

32. The magnetic recording medium of claim 30 wherein the thickness of said layer of magnetically permeable material is such that a portion of said layer becomes saturated by a flux whose magnitude is less than that required to alter the magnetization of said coercive layer.

33. A magnetic recording medium comprising:
a nonmagnetic substrate;
a first layer of magnetic material for storing magnetically defined information therein; and
a second layer of magnetic material having a magnetic permeability and a thickness relative to that of said first layer such that the magnitude of magnetic flux required to saturate said second layer is less than the magnitude of magnetic flux required to alter information stored in said first layer.

34. In a method of processing magnetic signals using a magnetic transducer having a physical transducing gap positioned to transfer the signals with respect to a magnetic storage medium having a magnetically coercive layer whose magnetization is altered to store information and with respect to which the signals are transferred, the improvement comprising:
(a) providing the magnetic storage medium with a layer of magnetically permeable material capable of selective establishment of adjacent areas of different permeabilities; and
(b) generating a magnetic bias flux during signal transfers between the transducer and the magnetically coercive layer productive to establish adjacent areas of different permeabilities at a portion of the layer of magnetically permeable material proximate of the transducing gap.

* * * * *